United States Patent
Sapija et al.

(10) Patent No.: US 11,555,557 B2
(45) Date of Patent: Jan. 17, 2023

(54) MITIGATING ICE BUILD UP IN A FLUID HANDLING ASSEMBLY

(71) Applicant: Goodrich Corporation, Charlotte, NC (US)

(72) Inventors: Dariusz Sapija, Siechnice (PL); Agata Kurowska, Kowale (PL); Piotr Zajac, Wrocław (PL)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/377,447

(22) Filed: Jul. 16, 2021

(65) Prior Publication Data

US 2022/0018464 A1    Jan. 20, 2022

(30) Foreign Application Priority Data

Jul. 17, 2020    (EP) .................................... 20461545

(51) Int. Cl.
    *F16K 49/00*    (2006.01)
    *E03B 7/10*    (2006.01)
    *E03B 7/12*    (2006.01)

(52) U.S. Cl.
    CPC .............. *F16K 49/002* (2013.01); *E03B 7/10* (2013.01); *E03B 7/12* (2013.01); *Y10T 137/1189* (2015.04); *Y10T 137/1244* (2015.04)

(58) Field of Classification Search
    CPC ......... Y10T 137/1189; Y10T 137/1244; E03B 7/10; E03B 7/12; F16K 49/002; F16L 53/38
    USPC ........................................................ 138/28
    See application file for complete search history.

(56) References Cited

U.S. PATENT DOCUMENTS

| | | | | |
|---|---|---|---|---|
| 3,847,182 A | * | 11/1974 | Greer ........................ | F15B 1/14 138/30 |
| 3,913,602 A | * | 10/1975 | Yoon ..................... | F16K 49/002 137/60 |
| 4,215,726 A | * | 8/1980 | Tagami ................... | F16L 51/00 138/28 |
| 6,019,118 A | | 2/2000 | Voggenreiter et al. | |

(Continued)

FOREIGN PATENT DOCUMENTS

| | | |
|---|---|---|
| CN | 101769392 A | 7/2010 |
| CN | 205806557 U | 12/2016 |
| KR | 20190008058 A | 1/2019 |

OTHER PUBLICATIONS

Machine translation KR 20190008058.*

(Continued)

*Primary Examiner* — Kevin F Murphy
(74) *Attorney, Agent, or Firm* — Cantor Colburn LLP

(57) ABSTRACT

A fluid handling assembly comprising a cavity in which water may become trapped due to use of the assembly, and a membrane disposed in the cavity. The membrane divides the cavity into a first sub-cavity on a first side of the membrane that is configured to collect any water trapped in the cavity and a second sub-cavity on a second, opposite side of the membrane. The membrane is configured to change shape such that the first sub-cavity increases in volume and the second sub-cavity decreases in volume in response to being subjected to water freezing conditions. The increase in volume accommodates an increase in volume of any water that may be trapped in the first sub-cavity when it freezes to ice.

15 Claims, 3 Drawing Sheets

(56) References Cited

U.S. PATENT DOCUMENTS

| | | | | |
|---|---|---|---|---|
| 6,142,172 | A * | 11/2000 | Shuler | E03B 9/14 |
| | | | | 137/59 |
| 6,536,458 | B1 * | 3/2003 | Kindermann | E03B 7/12 |
| | | | | 137/59 |
| 6,672,337 | B2 * | 1/2004 | Kobayashi | F16L 55/045 |
| | | | | 220/721 |
| 6,830,063 | B1 * | 12/2004 | Ball | E03B 7/10 |
| | | | | 137/59 |
| 7,203,419 | B2 * | 4/2007 | Malone | F16L 53/38 |
| | | | | 392/479 |
| 8,469,335 | B2 | 6/2013 | Batson et al. | |
| 11,078,651 | B2 * | 8/2021 | Kim | F16K 31/002 |
| 2002/0074742 | A1 | 6/2002 | Quoiani | |
| 2008/0079222 | A1 | 4/2008 | Namuduri et al. | |
| 2013/0248751 | A1 | 9/2013 | Anderson | |
| 2019/0154169 | A1 * | 5/2019 | Povey | F16L 55/02772 |

OTHER PUBLICATIONS

Abstract of CN101769392A, 2 pages.
Abstract of CN205806557U, 1 page.
Abstract of KR20190008058A, 2 pages.
Extended European Search Report for International Application No. 20461545.4 dated Dec. 3, 2020, 7 pages.

* cited by examiner

MITIGATING ICE BUILD UP IN A FLUID HANDLING ASSEMBLY

CROSS-REFERENCE TO RELATED APPLICATIONS

This application claims priority to European Patent Application No. 20461545.4 filed Jul. 17, 2020, the entire contents of which is incorporated herein by reference.

TECHNICAL FIELD

The present disclosure relates to a fluid handling assembly. The present disclosure also relates to a fluid valve, an aircraft water system and a method of accommodating ice build-up from water trapped in a fluid handling assembly.

BACKGROUND

Fluid handling assemblies are generally used to transport fluids. Such fluid handling assemblies generally include components such as pipes, tanks, valves and/or connectors that can be connected together in a system to hold, transport and divert fluid where necessary for use. Fluid handling systems are used in many different industries, such as for carrying fluids around manufacturing plants, homes and vehicles. During use, the fluid that is carried by the fluid handling assemblies may inadvertently leak into cavities defined within the assemblies that are not intended to carry fluid (e.g. between the components of the assembly and connections there between) and become trapped therein. Even if the assembly is drained or fluid is no longer flowed through the assembly, the fluid in the cavities can remain trapped therein. Often such fluids will contain a water or a water-based component. If the assembly encounters temperatures that fall to around or below the freezing point of water, then the water therein will turn to ice. It is a well-known phenomenon that the volume of the ice formed is greater than the volume of water it is formed from (the increase in volume being around 10%). This change in volume when the ice forms can fill the cavity and push against the walls/components that define the cavity. This can put harmful stress on the fluid handling assembly components and the connections there between. Over time, this stress may lead to damage of fluid handling assemblies and the fluid handling systems they are used in.

One particular example of an application where this problem is of particular concern is in the fluid handling systems of airplanes, such as a water system e.g. that stores and carries potable water for the aircraft cabin. When the airplane experiences temperatures about or below the freezing point of water for a sustained period, e.g. during a prolonged period of storage, the aforementioned harmful icing therein can occur.

It is known to provide an active heating system (e.g. heating wires) in the vicinity of fluid handling assemblies that are particularly sensitive to the harmful effects of the aforementioned icing issue. Such systems are powered and used to actively and continuously heat the assembly to keep the water trapped therein from freezing despite external/environmental temperatures. Such systems have been found to have some drawbacks. For example, they need to be continuously supplied with electrical power to function and have been known to fail or otherwise be unreliable and inefficient for solving the icing problem over longer periods of time (e.g. weeks and months). Such systems may also provide electrical "noise" that negatively interferes with other electric systems e.g. on the airplane.

Accordingly, the present disclosure aims to address these drawbacks by instead using a passive method that accommodates the expansion of any ice that may form from water trapped in such fluid handling assemblies to prevent the stress generated thereby from occurring. Other advantages and benefits of various features of the present disclosure may also be achieved, as will become apparent from the description below.

It is to be appreciated that there are also many other examples of applications where the aforementioned problem can occur, for example, in other fluid handling systems in aircrafts (e.g. chemical and hydraulic fluid handling systems), vehicles, manufacturing and domestic settings (e.g. in central heating and water systems in homes). The present disclosure accordingly extends to include all such applicable applications where the embodiments thereof can be suitably applied.

SUMMARY

From one aspect, the present disclosure provides a fluid handling assembly comprising a cavity in which water may become trapped due to use of the assembly and a membrane disposed in the cavity. The membrane divides the cavity into a first sub-cavity on a first side of the membrane that is configured to collect any water trapped in the cavity and a second sub-cavity on a second, opposite side of the membrane. The membrane is configured to change shape such that the first sub-cavity increases in volume and the second sub-cavity decreases in volume in response to being subjected to water freezing conditions.

In an embodiment of the above, the volume of the first sub-cavity increases by about 10%.

In a further embodiment of any of the above, the membrane comprises a shape memory alloy that has a transition temperature range that causes the change of shape to occur at about the freezing temperature of water. In one example, the transition temperature range may be between 5° C. to 0° C. (41° F. to 32° F.).

In a further embodiment of any of the above, the change of shape of the membrane is reversible, such that the second sub-cavity increases in volume and the first sub-cavity decreases in volume an equal and opposite amount in response to the membrane being subjected to water melting conditions.

In a further embodiment of any of the above, an elastic adhesive is provided in the second sub-cavity for securing the membrane in place in the cavity.

In a further embodiment of any of the above, a heating wire is disposed in the second sub-cavity and in thermal communication with the membrane.

In a further embodiment of any of the above, a Peltier device is provided in thermal communication with the membrane. In addition, a heat sink may also be provided in thermal communication with the Peltier device.

In a further embodiment of any of the above, the membrane further comprises a coating or sleeve. The coating or sleeve can be a plastic or silicone coating or sleeve.

From another aspect, the present disclosure provides a fluid valve comprising a valve body, a valve seal, and the fluid handling assembly of any of the embodiments of the above aspect. The cavity defined between the valve body and the valve seal. The first sub-cavity is defined between the valve seal and the membrane. The second sub-cavity is defined between the membrane and the valve body.

In an embodiment of the above, the valve is a ball valve.

From yet another aspect, the present disclosure provides an aircraft water system comprising the assembly or the fluid valve of either of the above aspects.

From yet another aspect, the present disclosure provides a method of accommodating ice build-up from water trapped in a fluid handling assembly. The method comprises: disposing a membrane in a cavity of the assembly where water may become trapped due to use of the assembly; using the membrane to divide the cavity into a first sub-cavity on a first side of the membrane that is configured to collect any water trapped in the cavity and a second sub-cavity on a second, opposite side of the membrane; configuring the membrane to change shape such that the first sub-cavity increases in volume and the second sub-cavity decreases in volume in response to being subjected to water freezing conditions in order to accommodate an increase in volume of any water that may be trapped in the first sub-cavity when it freezes to ice.

In an embodiment of the above, the step of configuring the membrane further comprises making the membrane out of a shape memory alloy that has a transition temperature range that causes the change of shape to occur at about the freezing temperature of water. In one example, the transition temperature range may be between 5° C. to 0° C. (41° F. to 32° F.).

In a further embodiment of any of the above, the method further comprises making the membrane by 3D printing.

BRIEF DESCRIPTION OF DRAWINGS

One or more non-limiting examples will now be described, by way of example only, and with reference to the accompanying figures in which.

DETAILED DESCRIPTION

Figure 1:
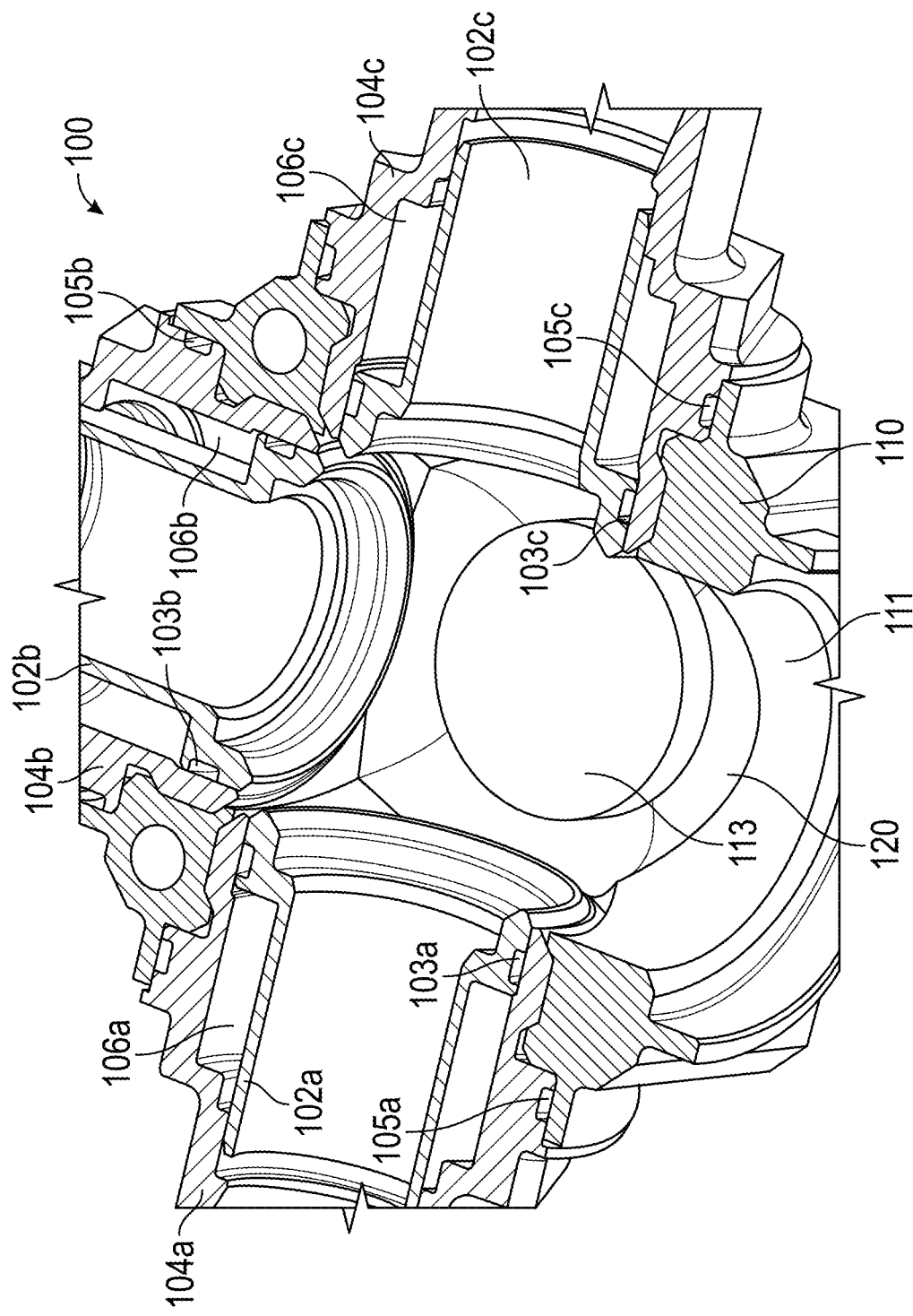
FIG. 1 illustrates an interior view of a ball valve in accordance with an embodiment of this disclosure.
Figure 2:
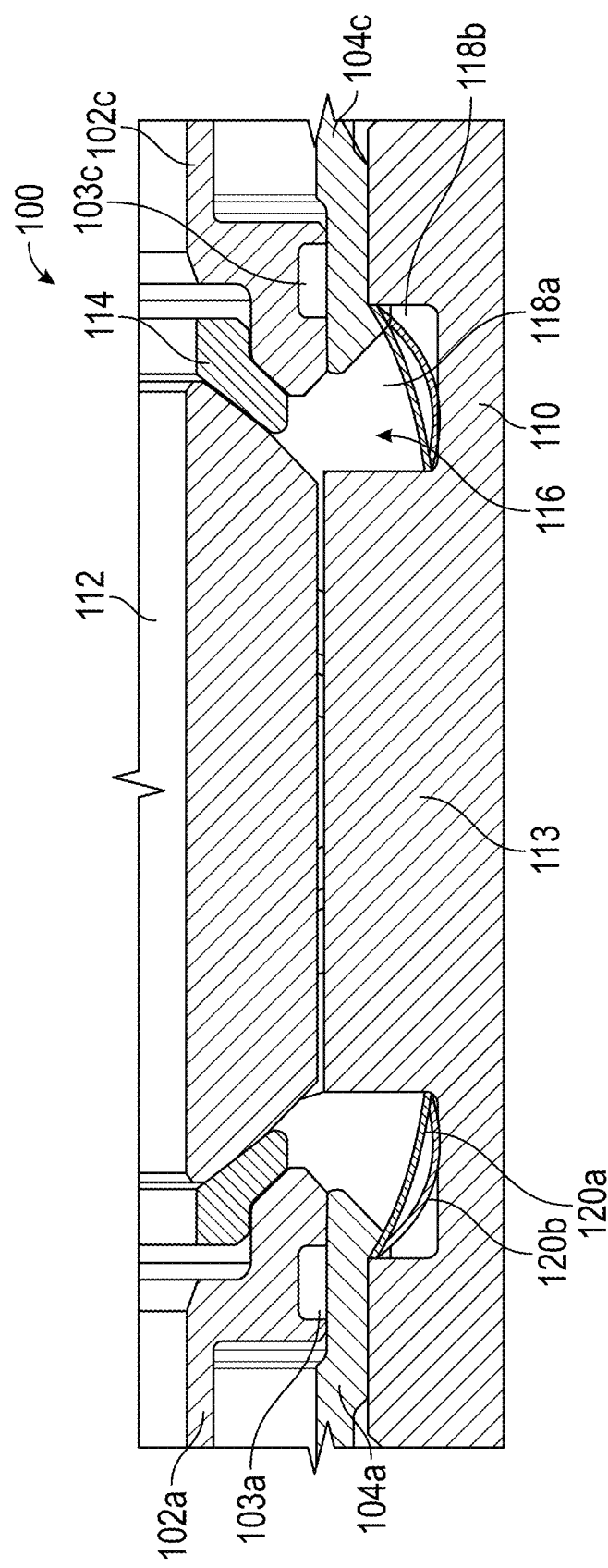
FIG. 2 illustrates a cross-sectional view of the ball valve of FIG. 1.

With reference to FIGS. 1 and 2, an example of a fluid handling assembly in accordance with the present disclosure is shown in the form of a fluid valve, and in particular, a ball valve 100.

The ball valve 100 includes a valve body 110 that receives a plurality of ports 102a, 102b, 102c. Each port 102a, 102b, 102c is connected to a respective pipe connector 104a, 104b, 104c that permits connection between the valve body 110 and a plurality of pipes (not shown) such that the pipes can be connected into fluid communication with the valve 100.

The pipe connectors 104a, 104b, 104c are fixedly received in respective apertures 111 of the valve body 110, and the ports 102a, 102b, 102c are fixedly received in the respective connectors 104a, 104b, 104c. A plurality of seals, such as O-ring seals (not shown) may be provided between the valve body 110 and connectors 104a, 104b, 104c in recesses 105a, 105b, 105c disposed in each connector 104a, 104b, 104c. A plurality of seals, such as O-ring seals (not shown) may also be provided between the ports 102a, 102b, 102c and connectors 104a, 104b, 104c in recesses 103a, 103b, 103c disposed in each port 102a, 102b, 102c. The use of the seals in respective recesses 103a, 103b, 103c, 105a, 105b, 105c can help provided a fluid tight connection between the ports 102a, 102b, 102c, connectors 104a, 104b, 104c and the valve body 110.

The ball valve 100 includes a ball shaft 112 rotatably mounted inside the valve body 110. Specifically, in the depicted embodiment, the ball shaft 112 is rotatably mounted on a support 113 that is formed from the valve body 110. The rotation of the ball shaft 112 can be controllable using an external lever or motor (not shown) connected thereto. As is known in the art, a ball with apertures there through (not shown) can be mounted to and rotated with the ball shaft 112 in order to permit and block fluid communication between the different ports 102a, 102b, 102c as required to control the flow of fluids between the pipes connected to the connectors 104a, 104b, 104c using the valve 100. The ball has been omitted from the figures to permit clearer explanation of the other features of the valve 100.

A valve seal 114 is disposed between the ball shaft 112 and the ports 102a, 102b, 102c. The seal 114 is an annular seal that is intended to provide a fluid-tight seal between the ball shaft 112 and the ports 102a, 102b, 102c to prevent fluid communicated through the valve 100 passing between the ports 102a, 102b, 102c and the ball shaft 112.

A cavity 116 is defined generally between the valve body 110 and the valve seal 114. In the depicted embodiment, the cavity 116 is an annular cavity, and is fully defined between the combination of the valve body 110, connectors 104a, 104b, 104c, ports 102a, 102b, 102c, seal 114, and ball shaft 112.

The valve seal 114 and other connection seals (e.g. in recesses 103a, 103b, 103c, 105a, 105b, 105c) are intended to prevent any fluid that flows through the valve 100 during use from passing into the cavity 116 and becoming trapped in the valve body 110. Unfortunately, in reality the seals are not perfect or degrade over time, and so during use of the valve 100 a certain amount of leakage of fluid into the cavity 116 will occur. This fluid may become trapped in the cavity 116, and may not readily pass back through the seals, even when the valve 100 is not in use and has been drained.

A membrane 120 is disposed in the cavity 116. The membrane 120 splits the cavity 116 into two sub-cavities 118a, 118b. The first sub-cavity 118a is on a first side of the membrane 120 and is defined between the valve seal 114 and the membrane 120 (i.e. 'above' the membrane 120 in FIG. 2). The second sub-cavity 118b is on a second, opposite side of the membrane 120 and is defined between the membrane 120 and the valve body 110 (i.e. 'below' the membrane 120 in FIG. 2). Since the first sub-cavity 118a is disposed between the valve seal 114 (and other connection seals in recesses 103a, 103b, 103c, 105a, 105b, 105c) and the membrane 120, it will collect any water that leaks past the seals into cavity 116 and becomes trapped therein. The second sub-cavity 118b is separated from the first sub-cavity 118a by the membrane 120 (which is impermeable) and so does not collect any trapped water.

Accordingly, the membrane 120 acts as a shim that can be used to dictate the volume of the first sub-cavity 118a, and thus dictate how much water can be collected therein. Therefore, the membrane 120 can be used to limit the volume of water that can be trapped in the valve body 110 in the first place.

In the depicted embodiment, the second sub-cavity is provided with an elastic adhesive, such as a resin or gel. The elastic adhesive is used to secure the membrane 120 in place. The elastic adhesive can fill the second sub-cavity 118b, which also helps ensure it remains free of trapped water. The elastic adhesive is used to secure the membrane 120 in place, whilst permitting the movement thereof between first and second shapes 120a, 120b (as discussed below). The elastic adhesive can be chosen to provide a desired amount of damping to the movement of the membrane 120 and/or improve vibration absorption and resistance.

In one example, the elastic adhesive is a silicone adhesive/sealant or in another example, is a polyurethane adhesive/sealant. However, any suitable elastic adhesive, resin or gel can be used within the scope of the present disclosure.

Although the depicted example includes an elastic adhesive in the second sub-cavity 118b, it is to be understood that in alternative embodiments the sub-cavity 118b need not include any elastic adhesive.

In addition or alternatively to the use of elastic adhesive, the membrane 120 may be fixedly secured to the valve body 110 via other means. For example, by a welding process, such as sonic welding.

As mentioned above, the membrane 120 is configured to change shape between a first shape 120a and a second shape 120b in response to the membrane 120 being subjected to water freezing conditions (i.e. temperatures that can freeze water). The membrane 120 changes shape such that in the second shape 120b the volume of the first sub-cavity 118a is increased and the volume of the second sub-cavity 118b is decreased compared to the first shape 120a. In this manner, when water trapped in the first sub-cavity 118a is subjected to conditions that freeze it to ice (e.g. water freezing temperatures), the increase in volume thereof will be accommodated by the increase in volume of the first sub-cavity 118a due to the shape change of the membrane 120.

The membrane 120 is also configured such that the change of shape is reversible so that the second sub-cavity increases in volume and the first sub-cavity decreases in volume an equal and opposite amount in response to the membrane 120 being subjected to water melting conditions. In this manner, the membrane 120 will revert back to the first shape 120a from the second shape 120b (and/or remain in the first shape 120a) when it is subjected to water melting conditions (i.e. temperatures above the freezing temperature of water). This change of shape can ensure that the volume of the first sub-cavity 118a (and thus amount of trapped water) does not increase over time should the valve 100 be exposed to different cycles of use and external conditions. This movement can also be used to apply stress to the melting ice and drive water out of the first sub-cavity 118a as it melts from the ice therein. This is discussed in more detail in relation to FIG. 3 below.

It is known that the freezing of water to ice can increase its volume by about 10%, for example, between 9-11%. Accordingly, in some embodiments, the membrane 120 shape change is configured to provide a corresponding about 10% increase in volume of the first sub-cavity 118a (and decrease in volume of the second sub-cavity 118b) to accommodate this expansion. This ensures that even if the first sub-cavity 118a is completely filled with water, the expansion thereof when it turns to ice can be fully accommodated. In other embodiments, the first sub-cavity 118a may increase in volume above or below this % amount depending on the application, starting volume of the first sub-cavity 118a and amount of water that is anticipated on being trapped in the first sub-cavity 118a.

In the depicted embodiments, the membrane 120 is formed of a shape memory alloy (SMA) which permits the change of shape to occur. As is known in the art, an SMA exhibits a 'shape memory effect' and can be configured to undergo a reversible (i.e. two-way) shape memory phase transition between a first, predetermined shape above a transition temperature and exhibit a second, predetermined shape below the transition temperature. The first and second shapes adopted by the SMA can be 'trained' into the SMA using thermo-mechanical treatments.

In general, the shape memory phase transformation of SMAs does not occur at one particular temperature, but rather over a temperature range, beginning at a start temperature ($A_s$ or $M_s$) and completing at a finish temperature ($A_f$ or $M_f$). As is well-known in the art, the start and finish temperatures can be tailored by cold working and/or annealing the SMA, as well as by using additional alloying elements to provide a desired transition temperature range.

A particularly suitable SMA for use in the present disclosure is an Ni—Ti alloy. Nitinol is one such Ni—Ti alloy with roughly equal atomic percentages of Ni and Ti (i.e. between 50 at. % Ni 50 at. % Ti to 60 at. % Ni 40 at. % Ti). Other suitable Ni—Ti alloys may include NiTiFe (e.g. Tinel®), NiTiNb or NiTiCu. However, within the scope of this disclosure, any other suitable SMA may be also used in the membrane 120, as is known in the art (e.g. an alloy of Fe—Mn—Si, Cu—Zn—Al, Cu—Al—Ni).

As discussed above, the membrane 120 is configured to change shape between the first and second positions 120a, 120b and vice versa when the membrane 120 is subjected to water freezing/melting conditions. Therefore, the membrane 120 is configured to undergo the change of shape at around the freezing temperature of water (i.e. about 0° C. (about 32° F.)). It is important to ensure that the change of shape occurs either just before or at the same time as any potential ice forms. This is so the volume change can be accommodated before the ice has a chance to exert stress on the valve 100. Therefore, the transition temperature range of the membrane 120 for changing shape between the first and second shape 120a, 120b can be tailored to be just above the freezing temperature of water, for example, between 5° C. to 0° C. (41° F. to 32° F.).

Although this is one particularly suitable transition temperature range, it is to be understood that any other suitable transition temperature range can be used within the scope of this disclosure. For example, the precise transition temperature range may be varied as necessary, depending on the water freezing conditions for a specific application (e.g. due to the ambient pressure that the valve 100 is stored/used in) and/or the necessary responsiveness of the membrane 120 to ambient temperature changes around the valve 100.

Although the membrane 120 of the depicted embodiments is formed of an SMA, within the scope of this disclosure the membrane 120 can be formed of any other material/configuration that can provide a suitable passive changes in shape at water freezing/melting conditions.

In one such example, the membrane 120 has a bimetallic strip construction. In such an example, the membrane 120 is made of two different metal layers stacked on top of each other that each have differential thermal coefficients of expansion. As is known in the art, the metal layers and their relative thermal coefficients of expansion can be tailored to provide the required shape change in the membrane 120 at the required temperature conditions.

In some embodiments, the membrane 120 may further comprise a coating or sleeve (e.g. around an SMA (or bimetallic) core). The coating or sleeve can be provided to help protect the membrane 120 from harsh or corrosive environments and operating conditions. Some suitable examples of sleeves/coatings are plastic or silicone, although any suitable coating/sleeve can be used depending on the protection required for a particular application.

The specific form and shape of the membrane 120 can be varied as necessary for a particular application and fluid handling assembly, and will depend on where the cavity 116 is defined, and its size and shape. Within the scope of this disclosure, the membrane 120 can take any suitable form or shape as is necessary to span such a cavity 116 and define the first and second sub-cavities 118a, 118b discussed above for all such applications and fluid handling assemblies.

The membrane 120 can be manufactured via any suitable method, for example, by casting. However, in one example, the membrane 120 is manufactured via additive manufacturing and in particular, 3D printing. Such a manufacturing method permits the membrane 120 to be made into relatively complex and/or intricate shapes in a cost effective manner, and so can facilitate the use of the membrane 120 in various application and assemblies, and allows it to be more easily adapted and produced for particular cavities 116 therein. Such 3D printing techniques are well-known in the art, and can be utilised with many different alloys. However, Ni—Ti alloys may be particularly suitable for manufacture with such 3D printing techniques.

Figure 3:
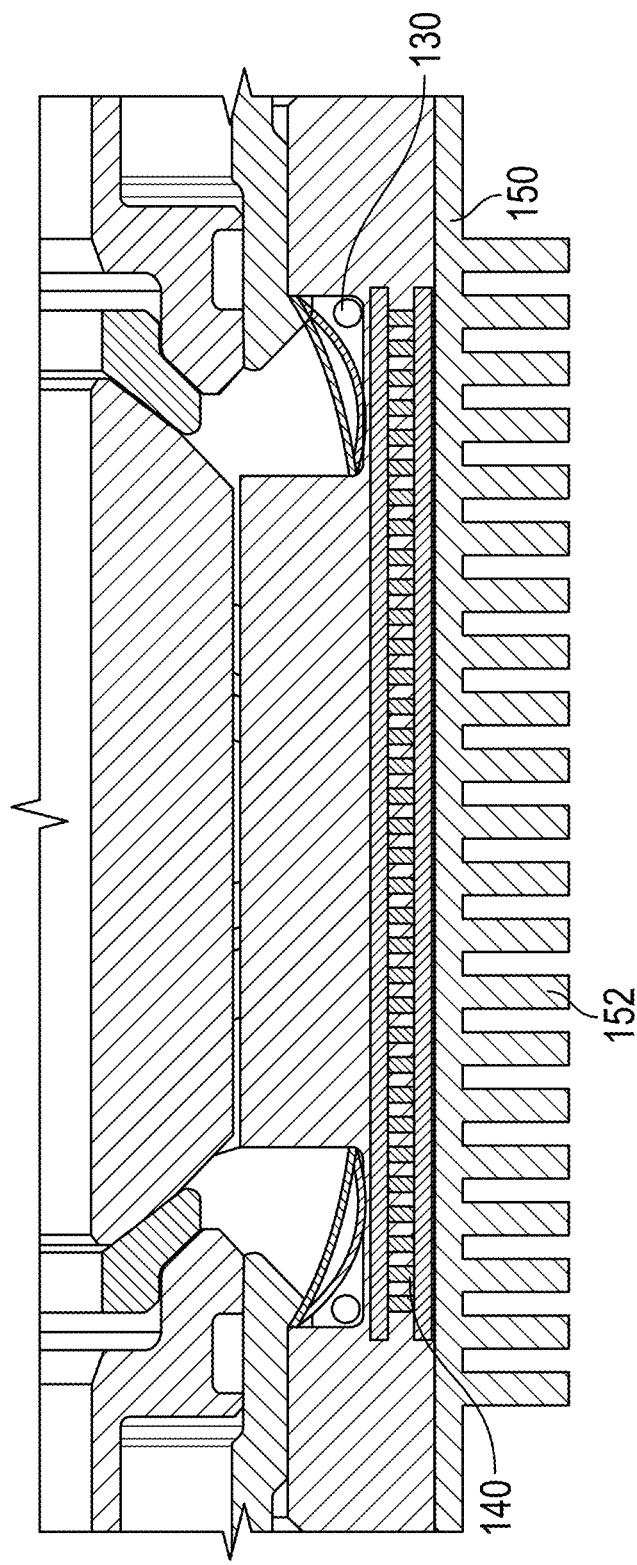
FIG. 3 illustrates a cross-sectional view of an additional embodiment of the ball valve of FIG. 2 that includes additional thermal control features.

With reference to FIG. 3, an additional embodiment of the valve 100' is shown. The valve 100' has the same features as valve 100 discussed in relation to FIG. 2, but has additional thermal control features 130, 140, 150 added thereto. The shared features between valves 100 and 100' have not been labelled in FIG. 3 and will not be discussed below, as the description thereof above and depiction in FIG. 2 applies equally thereto.

The valve 100' includes a heating wire 130 disposed in the second sub-cavity 118b. The heating wire 130 is in thermal communication with the membrane 120. The heating wire 130 can be secured within the elastic adhesive in embodiments that include it. The heating wire 130 is connected to an external controller and power source (not shown) that allows the hearting wire 130 to be actively heated when required. In this manner, the heating wire 130 can be operated as the temperature rises from below to above freezing (i.e. towards water melting conditions) to encourage the membrane 120 to change shape back to the first position 120a. This can be used to help generate a driving force using the membrane 120 to try to push trapped water that is melting from ice out of the first sub-cavity 118a to remove it therefrom. In some embodiments, the wire 130 can be cycled on and off to aid with this driving force. The heating wire 130 can also generally help increase the responsiveness of the membrane 120 to water melting conditions being present around the valve 100. This can minimise further water that may be allowed to ingress into the cavity 116 if the membrane 120 did not change shape back to the first position 120a as soon as ice started melting.

The valve 100' also includes a Peltier device 140. The Peltier device 140 is in thermal communication with the membrane 120. As is known in the art, the Peltier device 140 is a thermoelectric device that can transfer heat from one side of the device to the other in response to the application of a voltage thereto. The Peltier device 140 is connected to an external controller and power source (not shown) that allows the Peltier device 140 to be activated when required. In the depicted embodiment, the Peltier device 140 is configured such that when it is activated, heat will be carried away from the second sub-cavity 118b and the membrane 120 towards the exterior of the valve body 110. In this manner, the Peltier device 140 can be used to actively help cool the membrane 120. In this manner, the Peltier device 140 can help increase the responsiveness of the membrane 120 to water freezing conditions being present around the valve 100. This can minimise any stress induced by the formation of ice in the first sub-cavity 118a, as it can help ensure the membrane 120 changes shape promptly just before/as ice is forming. This prompt movement of the membrane 120 and the increase in volume of first sub-cavity 118a can also encourage the trapped water to settle on the membrane 120 as it freezes, rather than on the walls defining the cavity 118a. This can ultimately make the eventual ice easier to remove, as it will tend to stick to the moveable membrane 120, rather than the walls of the cavity 118a.

The Peltier device 140 can additionally or alternatively be used in the reverse configuration (e.g. by reversing the voltage applied thereto) to instead supply heat from the exterior of the valve body 110 to the second sub-cavity 118b and the membrane 120. In this mode of operation, the Peltier device 140 acts in a similar manner to the heating wire 130 discussed above, and shares the function and advantages thereof.

In the depicted embodiment, the Peltier device 140 is embedded within the valve body 110. However, the Peltier device 140 can be implemented in any suitable position, as long as it's in thermal communication with the membrane 120. In one example, the Peltier device 140 may alternatively be attached to the exterior of the valve body 110 itself.

The valve 100' also includes a heat sink 150 that is in thermal communication with the Peltier device 140. In the depicted embodiment, the heat sink 150 is fixedly attached to the valve body 110. The heat sink 150 may comprise a plurality of heat fins 152. The heat sink 150 acts as a passive device to aid heat extraction from the Peltier device 140. In other embodiments, the heat sink 150 may be formed as a radiator with fluid therein to help with heat dissipation and absorption.

Although FIG. 3 shows the heating wire 130, Peltier device 140 and heat sink 150 all used together in the valve 100', it is to be understood that they can be used in any combination or individually, as required depending on a particular application.

As discussed above, although a ball valve 100, 100' is depicted, the present disclosure is applicable to any other suitable type of fluid valve or fluid handling assembly where a cavity in which water can be trapped is present and a need to accommodate ice that may be formed therein exists. For example, the membrane 120 could also be used in the cavities 106a, 106b, 106c defined between the ports 102a, 102b, 120c and connectors 104a, 104b, 104c.

In one particularly suitable application, the fluid handling assembly of the present disclosure can be used as part of an aircraft water system, for example, which directs water around an aircraft cabin. However, as discussed above, the present disclosure is also applicable to several other applications, for example, in aircraft, vehicles, manufacturing and domestic settings. The present disclosure therefore accordingly extends to all such applications which fall within the scope of the claims.

The invention claimed is:

1. A fluid valve comprising:
   a valve body;
   a valve seal; and
     a cavity defined between the valve body and the valve seal in which water may become trapped due to use of the fluid valve; and
   a membrane disposed in the cavity, wherein the membrane divides the cavity into a first sub-cavity on a first side of the membrane that is configured to collect any water trapped in the cavity and a second sub-cavity on a second, opposite side of the membrane, wherein the first sub-cavity is defined between the valve seal and the membrane and the second sub-cavity is defined between the membrane and the valve body; and wherein the membrane is configured to change shape such that the first sub-cavity increases in volume and the second sub-cavity decreases in volume in response to being subjected to water freezing conditions; and an elastic adhesive provided in the second sub-cavity for securing the membrane in place in the cavity, wherein the elastic adhesive fills the second sub-cavity.

2. The fluid valve of claim 1, wherein the volume of the first sub-cavity increases by about 10%.

3. The fluid valve of claim 1, wherein the membrane comprises a shape memory alloy that has a transition temperature range that causes the change of shape to occur between 5° C. to 0° C. (41° F. to 32° F.).

4. The fluid valve of claim 1, wherein the change of shape is reversible, such that the second sub-cavity increases in volume and the first sub-cavity decreases in volume an equal and opposite amount in response to the membrane being subjected to water melting conditions.

5. The fluid valve of claim 1, further comprising a heating wire disposed in the second sub-cavity and in thermal communication with the membrane.

6. The fluid valve of claim 1, further comprising a Peltier device in thermal communication with the membrane.

7. The fluid valve of claim 6, further comprising a heat sink in thermal communication with the Peltier device.

8. The fluid valve of claim 1, wherein the membrane further comprises a plastic or silicone coating or sleeve.

9. The fluid valve of claim 1, wherein the valve is a ball valve.

10. An aircraft water system comprising the fluid valve of claim 1.

11. A method of accommodating ice build-up from water trapped in a fluid valve having a valve body and a valve seal, the method comprising:

disposing a membrane in a cavity of the fluid valve defined between the valve body and the valve seal where water may become trapped due to use of the fluid valve;

using the membrane to divide the cavity into a first sub-cavity on a first side of the membrane that is configured to collect any water trapped in the cavity and a second sub-cavity on a second, opposite side of the membrane, wherein the first sub-cavity is defined between the valve seal and the membrane and the second sub-cavity is defined between the membrane and the valve body;

configuring the membrane to change shape such that the first sub-cavity increases in volume and the second sub-cavity decreases in volume in response to being subjected to water freezing conditions in order to accommodate an increase in volume of any water that may be trapped in the first sub-cavity when it freezes to ice;

filling the second sub-cavity (118b) with an elastic adhesive; and securing the membrane (120) in place in the cavity (116) with the elastic adhesive.

12. The method of claim 11, wherein the step of configuring the membrane further comprises making the membrane out of a shape memory alloy that has a transition temperature range that causes the change of shape to occur between 5° C. to 0° C. (41° F. to 32° F.).

13. The method of claim 11, further comprising making the membrane by 3D printing.

14. The method of claim 11, wherein the elastic adhesive is a resin or gel.

15. The method of claim 11, wherein the elastic adhesive is a silicone or polyurethane sealant.

* * * * *